(12) United States Patent
Tsukuda

(10) Patent No.: US 7,514,140 B2
(45) Date of Patent: Apr. 7, 2009

(54) ACRYLIC FILM FOR LENS SUBSTRATE, LENS FILM USING THE SAME LENS SHEET

(75) Inventor: Yousuke Tsukuda, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 126 days.

(21) Appl. No.: 11/206,108

(22) Filed: Aug. 18, 2005

(65) Prior Publication Data

US 2006/0056032 A1 Mar. 16, 2006

(30) Foreign Application Priority Data

Aug. 23, 2004 (JP) ............................. 2004-241985
Jul. 7, 2005 (JP) ............................. 2005-198511

(51) Int. Cl.
 *B32B 5/16* (2006.01)
 *B32B 27/08* (2006.01)
 *B32B 27/30* (2006.01)

(52) U.S. Cl. ...................... 428/327; 359/619; 428/337; 428/520; 428/522

(58) Field of Classification Search ................. 428/327, 428/337, 520, 522; 359/619
See application file for complete search history.

(56) References Cited

U.S. PATENT DOCUMENTS 6,692,821 B2 * 2/2004 Koyama et al. ............. 428/213

FOREIGN PATENT DOCUMENTS

| JP | 1-128059 | 5/1989 |
|---|---|---|
| JP | 11-262958 | 9/1999 |

* cited by examiner

*Primary Examiner*—D. S Nakarani
(74) *Attorney, Agent, or Firm*—Foley & Lardner LLP

(57) ABSTRACT

An acrylic film for a lens substrate is provided. The film has a thickness of 400 μm or thinner and comprises a layer of a resin composition comprising a methacrylic resin and rubber particles dispersed therein. A lens layer can be placed on the acrylic film to produce a lens film excellent in light fastness. The lens film may be laminated on a resin sheet to produce a lens sheet suppressing its deformation such as warping or sagging.

3 Claims, No Drawings

US 7,514,140 B2

ACRYLIC FILM FOR LENS SUBSTRATE, LENS FILM USING THE SAME LENS SHEET

BACKGROUND OF THE INVENTION

1. Field of the Invention

The present invention relates to an acrylic film useful as a substrate of a lens film. The invention also relates to a lens film comprising the acrylic film as a substrate and further relates to a lens sheet obtained by laminating the lens film on a resin sheet.

2. Description of the Related Art

A transmission-type screen, which can be used in a projection-type television, a micro reader and the like, generally comprises a lens sheet such as Fresnel lens sheet and Lenticular lens sheet. Such a lens sheet can be produced by forming a lens layer of ultraviolet-setting type resin on a film substrate to obtain a lens film, and then laminating the lens film onto a resin sheet as a support. Thus-obtained lens sheet is advantageous in terms of fine pitch adjustment and productivity.

The lens film is known, for example, in Japanese Patent Application Laid-Open No.11-262958 such that a lens film is produced using a polyester or polycarbonate film as a substrate. The conventional lens film, however, may have insufficient light fastness, which may result in change in color, and may be easily warped or sagged depending on the environmental fluctuation when the lens film is laminated on a resin sheet.

SUMMARY OF THE INVENTION

The present inventors have made investigations to develop a lens film excellent in light fastness and hard to cause deformation such as warping or sagging even when it is laminated on a resin sheet. As a result, it has been found that such an aimed lens film can be obtained by using a rubber-containing acrylic film with a prescribed thickness as a substrate of the lens film. The present invention has been accomplished based on the findings.

That is, the present invention provides an acrylic film for a lens substrate, the film having a thickness of 400 μm or thinner and comprising a layer of a resin composition comprising a methacrylic resin and rubber particles dispersed therein. Further, the invention provides a lens film comprising the acrylic film and a lens layer of an ultraviolet-setting resin formed on the acrylic film, and also provides a lens sheet comprising the lens film and a resin sheet as a support, in which the lens film is laminated on the resin sheet.

On the acrylic film for a lens substrate in the present invention, a lens layer can be placed to produce a lens film excellent in light fastness. The lens film may be laminated on a resin sheet to produce a lens sheet suppressing its deformation such as warping or sagging.

DETAILED DESCRIPTION OF THE PREFERRED EMBODIMENTS

An acrylic film for a lens substrate in the present invention has a thickness of 400 μm or thinner and comprises a layer of a resin composition comprising a methacrylic resin and rubber particles dispersed therein.

The methacrylic resin used in the present invention is at least one polymer obtained mainly from a methacrylic acid ester. Preferably, the methacrylic resin is a thermoplastic polymer obtained by polymerizing a composition comprising 50 to 100% by weight of an alkyl methacrylate having an alkyl group with 1 to 4 carbon atoms, 0 to 50% by weight of an acrylic acid is ester and 0 to 49% by weight of at least one of other vinyl monomers copolymerizable with the alkyl methacrylate and/or the acrylic acid ester, these percents of which are on the weight basis of the composition. In the composition, the acrylic acid ester is preferably contained in the range of 0.1 to 50% by weight and more preferably in the range of 0.5 to 50% by weight, while the alkyl methacrylate is preferably contained in the range of 50 to 99.9% by weight and more preferably in the range of 50 to 99.5% by weight, on the weight basis of the composition. It is noted that in this specification, the "monomer" include not only a single monomer but also a plurality of monomers in a mixed state, i.e., so-called monomer mixture.

Examples of the alkyl methacrylate providing the above-mentioned thermoplastic polymer include methyl methacrylate, ethyl methacrylate and butyl methacrylate. Particularly, methyl methacrylate is preferably used.

The acrylic acid ester providing the above-mentioned thermoplastic polymer may be an acrylic acid alkyl ester in which the alkyl group has 1 to 8 carbon atoms. Examples of the acrylic acid ester include methyl acrylate, ethyl acrylate and butyl acrylate.

The above-mentioned other vinyl monomers copolymerizable with the alkyl methacrylate and/or the acrylic acid ester, may be monomers conventionally known in methacrylic resin fields. Examples of the vinyl monomer include an aromatic vinyl compound such as styrene and a vinyl cyano compound such as acrylonitrile.

The above-described polymer (such as the thermoplastic polymer) may be used alone, or two or more of the polymers may be used in the form of the mixture thereof, to provide the methacrylic resin in the present invention.

One of preferable methacrylic resins comprises at least two kinds of polymers in which at least one polymer has a relatively low glass transition temperature, such as a glass transition temperature of 60° C. or lower. The glass transition temperature is preferably 40° C. or lower and is more preferably 20° C. or lower. Such preferable methacrylic resins have advantages such that the resulting acrylic film of the methacrylic resin has a high adhesion to a lens layer (such as a lens layer of an ultraviolet-setting resin).

The glass transition temperature in the present invention can be measured according to JIS K 7121 which corresponds to ASTM D 3418.

The glass transition temperatures of not only a single polymer but also a mixture of polymers can be measured in the same manner. When the glass transition temperature of the polymer mixture is measured, the glass transition temperature of the mixture as a whole is obtained.

When the methacrylic resin in the present invention comprises at least two kinds of polymers in which at least one polymer has a relatively low glass transition temperature, the is amount of the polymer with a low glass transition temperature in the methacrylic resin is preferably 5 to 80% by weight, and is more preferably 10 to 70% by weight, on the weight basis of the methacrylic resin. When the amount of the polymer with a low glass transition temperature is too large, the resulting acrylic film may have insufficient heat resistance. It is preferable to select the kind(s) and amount(s) of the methacrylic resin(s) other than the polymer with a low glass transition temperature so that a glass transition temperature of the methacrylic resin as a whole but excluding the polymer with a low glass transition temperature is preferably 70° C. or higher, more preferably 80° C. or higher.

In the present invention, the resin composition comprising the above-described methacrylic resin and rubber particles mentioned below is polymerized to obtain an acrylic film for a lens substrate or a layer in the acrylic film. The polymerization method of the resin composition is not particularly limited. Examples of the methods include a suspension polymerization, emulsion polymerization and bulk polymerization method. Among them, bulk polymerization method is preferably employed. In order to obtain a preferable glass transition temperature of the resin composition, or in order to obtain a viscosity suitable for providing desirable film formability, it is preferred to use a chain transfer agent at the time of the polymerization. The amount of the chain transfer agent may be determined adequately depending on the types of the monomers and the composition.

Before or during the polymerization, rubber particles are dispersed in the methacrylic resin in the present invention. The rubber particles preferably have an elastic polymer layer with an average particle diameter (a number average particle diameter) of from 0.15 µm to 0.35 µm. When the rubber particles have an elastic polymer layer with the average particle diameter in this range, a film having high impact resistance and excellent in the surface hardness and surface smoothness can be obtained. The average particle diameter of the elastic polymer layer is more preferable in the range of from 0.2 µm to 0.3 µm. When the average particle diameter of the elastic polymer layer in the rubber particles is too small, the surface hardness of the resulting film tends to be lowered and may become fragile. On the other hand, when the average particle diameter is too large, the surface smoothness of the film tends to be deteriorated.

In terms of light fastness of the resulting film, the rubber particles are preferably acrylic type particles which have an elastic polymer layer as a rubber component mainly made of an acrylic acid ester. The acrylic type rubber particles preferably have an elastic polymer layer as an inner layer and a hard layer (mainly made of methacrylic acid ester) as an outer layer.

Such preferable rubber particles may be obtained by a method in which monomers (consisting of 50 to 99.9% by weight of an alkyl acrylate, 0 to 49.9% by weight of at least one kind of other vinyl monomers non-crosslinkable, but copolymerizable with the alkyl acrylate and 0.1 to 10% by weight of a copolymerizable, crosslinkable monomer) are polymerized to obtain elastic copolymer layer (particle for providing inner layer), and in the presence of 100 parts by weight of the elastic copolymer layer, 10 to 400 parts by weight of monomers (consisting of 50 to 100% by weight of a methacrylic acid ester, 0 to 50% by weight of an acrylic acid ester and 0 to 49% by weight of at least one of other vinyl monomers copolymerizable therewith) are polymerized to obtain rubber particles having at least one polymer layer of the latter monomers as an outer layer, which is bonded to (or grafted with) the surface of the elastic copolymer layer.

The particle diameter of the elastic copolymer layer can be controlled by the polymerization conditions to be in the range of from 0.15 µm to 0.35 µm.

More specifically, the rubber particles can be produced by polymerizing the above-mentioned components for the elastic copolymer layer in at least one step by an emulsion polymerization method, and in the presence of the resulting elastic copolymer layer, polymerizing the above-mentioned monomers containing the methacrylic acid ester in at least on step by an emulsion polymerization. By such polymerization in a plurality of the steps, the monomers containing the methacrylic acid ester used in the latter step are graft-copolymerized with the elastic copolymer layer, to produce crosslinked elastic copolymer particles having graft chains. Thus obtained rubber particles are so-called "graft copolymer particles" having a multilayer structure containing a polymer of an alkyl acrylate as a main component of the rubber. In the case that the polymerization for obtaining the elastic copolymer layer is carried out in two or more steps, or the polymerization of the monomers containing the methacrylic acid ester as a main component is carried out in two or more steps, the amounts of the entire monomer composition in each of the former and latter polymerizations (rather than the amounts of monomer compositions in the respective steps) are preferably within the above-mentioned range.

With respect to the rubber particles, examples of the alkyl acrylate for providing the elastic copolymer layer include an alkyl acrylate having an alkyl group with 1 to 8 carbon atoms. Among them, an alkyl acrylate having an alkyl group with 4 to 8 carbon atoms such as butyl acrylate and 2-ethylhexyl acrylate is preferable.

Other vinyl monomers to be optionally used for providing the elastic copolymer layer in the above-mentioned rubber particles, which are copolymerizable with the alkyl acrylate, are monofunctional compounds having one polymerizable carbon-carbon double bond in one molecule thereof. Examples of such vinyl monomers include methacrylic acid esters such as methyl methacrylate, butyl methacrylate and cyclohexyl methacrylate; aromatic vinyl compounds such as styrene; and vinyl cyano compounds such as acrylonitriles.

The copolymerizable, crosslinkable monomer which can be used for the elastic copolymer layer, may be monomers having at least two polymerizable carbon-carbon double bonds in one molecule thereof. Examples of such monomer include unsaturated carboxylic acid diesters of glycols (such as ethylene glycol dimethacrylate and butanediol dimethacrylate); unsaturated carboxylic acid alkenyl esters (such as allyl acrylate, allyl methacrylate and allyl cinnamate); polybasic acid polyalkenyl esters (such as diallyl phthalate, diallyl maleate, triallyl cyanurate and triallyl isocyanurate); unsaturated carboxylic acid esters of polyhydric alcohol (such as trimethylol propanetriacrylate); and divinylbenzene. Among them, unsaturated carboxylic acid alkenyl esters and polybasic acid polyalkenyl esters are preferable. These crosslinkable monomers can be used independently or in combination of two or more of them.

As mentioned above, in order to obtain the rubber particles having inner and outer layers in the present invention, the elastic copolymer layer may be grafted with monomers containing a methacrylic acid ester, an optional acrylic acid ester and another optional other vinyl monomers copolymerizable therewith. Examples of the methacrylic acid ester which cab be grafted with the elastic copolymer layer, include methacrylic acid alkyl esters such as methyl methacrylate, ethyl methacrylate, butyl methacrylate, 2-ethylhexyl methacrylate and cyclohexyl methacrylate. Examples of the optional acrylic acid ester for the graft polymerization include acrylic acid alkyl esters such as methyl acrylate, ethyl acrylate, butyl acrylate and cyclohexyl acrylate. Examples of the optional other vinyl monomers for the graft polymerization include aromatic vinyl compounds such as styrene and vinyl cyano compounds such as acrylonitrile.

The amount of the monomers for the graft polymerization may be in the range of 10 to 400 parts by weight (as mentioned above), and is preferably in the range of 20 to 200 parts by weight, based on 100 parts by weight of the elastic copolymer layer to be grafted. The graft polymerization may be conducted in one or more steps, which is also mentioned above. When the amount of the monomers for the graft polymerization is 10 parts by weight or more, then aggregation of the elastic copolymer layer (particle) is hardly caused, which results in less uneven surface of the resulting film. When the amount of the monomers for the graft polymerization is too large, then the fluidity of the entire body of the resin in which the rubber particles are dispersed tends to decrease, which might make film formation difficult. Therefore, the amount of the monomers is preferably controlled so as to be within the above-mentioned range.

The rubber particles in the present invention may have a multilayer structure comprising at least three layers by forming a hard polymer layer mainly made of a methacrylic acid ester in the inside of the elastic copolymer layer. Such rubber particles with a multilayer structure can be obtained by a method in which monomers for the hard polymer layer as an innermost layer are at first polymerized to obtain a hard polymer layer, the monomers for the above-mentioned elastic copolymer layer are polymerized in the presence of the hard polymer layer to provide an elastic copolymer layer having the innermost hard polymer layer therein, and further in the presence of the elastic copolymer layer, the monomers mainly containing the methacrylic acid ester may be polymerized so as to be grafted with the elastic copolymer layer. The rubber particles having the at least three-layer structure comprising such a hard polymer layer as the innermost layer are preferably used in terms of the surface hardness of the resulting film.

The hard polymer layer as the innermost layer is preferably formed by polymerization of monomers consisting of 70 to 100% by weight of a methacrylic acid ester and 0 to 30% by weight of other vinyl monomers polymerizable with the methacrylic acid ester. As the methacrylic acid ester, it is preferable to use methacrylic acid alkyl esters, particularly methyl methacrylate. Examples of the optional other vinyl monomers for the innermost layer include acrylic acid esters such as methyl acrylate, ethyl acrylate, butyl acrylate and cyclohexyl acrylate; aromatic vinyl compounds such as styrene; and vinyl cyano compounds such as acrylonitrile. Alternatively, it may be effective to use a copolymerizable, crosslinkable monomer as one of the optional other vinyl monomers. Examples of the optional crosslinkable monomer for the innermost layer include compounds having two or more polymerizable carbon-carbon double bonds in one molecule thereof, which are those exemplified above for the component for the elastic copolymer layer. Such rubber particles with three-layer structure may be produced in the method disclosed, for example, in Japanese Examined Patent Publication No. 55-27576 (corresponding to U.S. Pat. No. 3,793,402). The rubber particles obtained in accordance with the process in Example 3 of the publication can be preferably used in the present invention.

It is noted that in the case of preparing such rubber particles with a multilayer structure having at least three layers, the above-mentioned amount, 10 to 400 parts by weight, of the methacrylic acid esters to be grafted for the outermost layer is measured on the basis of the 100 parts by weight in total of the hard polymer layer (as the innermost layer) and the elastic copolymer layer (as the intermediate layer between the innermost and outermost layers).

In the present invention, the average particle diameter of the elastic polymer layer in the rubber particles may be controlled to be in the preferable range of 0.15 μm to 0.35 μm or smaller, by adjusting the amount of an emulsifying agent in emulsification polymerization and the amounts of the monomers. The average particle diameter can be measured by the steps of mixing the rubber particles with a methacrylic resin as a mother phase, forming a film of the mixture, coloring (dying) the rubber component in a cross-section of the film with ruthenium oxide and observing the cross-section to measure the diameter of the outermost layer part of the dyed particles. In the method including these steps, the methacrylic resin as a mother phase is not dyed. In addition, when the rubber particles have a hard polymer layer mainly made of a methacrylic acid ester as the outermost layer of the rubber particles, the outermost layer is also not dyed while being mixed with the mother resin, whereas the elastic copolymer layer as inner layers mainly made of the alkyl acrylate is dyed. Therefore, the particle diameter of the elastic polymer layer in the the rubber particles can be obtained by measuring the diameter of the approximately circular dyed portion observed by an electronic microscope. When the rubber particles have a hard polymer layer as the innermost layer inside the elastic copolymer layer, the hard polymer layer as the innermost layer is also not dyed, while the outer-surface layer thereof, i.e., the elastic polymer layer as the intermediate layer, is dyed, which is observed so as to have a two-layer structure. In such a case, the average particle diameter of the elastic polymer layer in the the rubber particles corresponds to the outer diameter of the elastic copolymer layer.

The rubber particles are dispersed in a methacrylic resin to provide a resin composition for forming a film. The amount ratio of both components in the composition is preferably such that the amount of the methacrylic resin is 50 to 95 parts by weight, while the amount of the rubber particles is 5 to 50 parts by weight. When the amount of the rubber particles is too small, the impact resistance of the resulting film tends to be lowered, and the film may become fragile resulting from difficult film formation. When the amount of the rubber particles is too large, the flexibility of the resulting film tends to become high, which may result in a low modulus of elasticity and insufficient surface hardness of the film.

The rubber particles are preferably dispersed in a methacrylic resin so that the amount of the elastic copolymer layer mainly made of an acrylic acid ester in the particles is 3 to 35 parts by weight on the basis of 100 parts by weight in total of the methacrylic resin and the rubber particles. More preferably, the amount of the elastic copolymer is within the range of 5 parts by weight to 25 parts by weight on the basis of 100 parts by weight of the total of the methacrylic resin and rubber particles. When the amount of the elastic copolymer is 3 parts by weight or more based on 100 parts by weight in total of the methacrylic resin and rubber particles, the resulting film does not become fragile, and the film formability can be improved. On the other hand, when the amount of the elastic copolymer is too large, the transparency and surface hardness of the resulting film tend to be lowered.

In terms of the film formability in film formation and handling easiness in lens production, the above-mentioned resin composition preferably has a notched Izod impact of 3.5 kJ/m$^2$ or higher, more preferably has a notched Izod impact of 4 kJ/m$^2$ or higher and most preferably has a notched Izod impact of 5.5 kJ/m$^2$ or higher, which is measured in accordance with JIS K 7110.

The above-mentioned resin composition may contain a commonly utilized additive, if necessary. Examples of the additive include an ultraviolet absorbent, an organic type dye, a pigment, an inorganic coloring agent, an antioxidant, an antistatic agent, a light diffusing agent and the like.

An acrylic film for a lens substrate in the present invention can be produced, for example, by forming a resin composition containing the above-mentioned methacrylic resin, rubber particles and the optional additive, into a film with a thickness of 400 μm or thinner. If the thickness of the film is too thick, the continuous processibility is lowered at the time of obtaining a lens film with a lens layer or at the time of obtaining a lens sheet by laminating the lens film to a resin sheet, and also fine pitch formation becomes difficult. The thickness of the film is preferably 300 μm or thinner, and is more preferably 200 μm or thinner. The lower limit of the thickness of the film is not particularly limited, and may be 50 μm or thicker.

The acrylic film for the lens substrate in the present invention may a single layer film of the above-mentioned resin composition or may be a multilayer film comprising layers made of a plurality of types of the above-mentioned resin composition which comprises the methacrylic resin and the rubber particles dispersed therein.

In the multilayer film, the layer having a surface to be placed on a lens layer, is preferably made of a resin composition containing a mixture of two or more polymers as the methacrylic resin (as described above), one polymer of which has a relatively low glass transition temperature, specifically a glass transition temperature of 60° C. or lower, more preferably 40° C. or lower and most preferably 20° C. or lower, in order to provide a layer having an improved adhesion to the lens layer. Here, the content of the polymer with the low glass transition temperature is, as described before, preferably 5 to 80% by weight and more preferably 10 to 70% by weight on the basis of the entire methacrylic resin, while the glass transition temperature of the other polymers in the composition is, as described before, preferably 70° C. or higher and more preferably 80° C. or higher.

On the other hand, at least one layer on which the lens layer is not to be placed in the multilayer film is preferably made of a resin composition substantially free from the above-mentioned polymer having the low glass temperature as the methacrylic resin, in order to have improved heat resistance of the resulting multilayer film. Here, the glass transition temperature of the polymer (or of the polymer mixture) as the methacrylic resin in the resin composition is preferably 70° C. or higher, and is more preferably 80° C. or higher.

Preferable multilayer films are a multilayer film having a two layer structure, one layer of which is made of the resin composition containing a polymer having the above-mentioned low glass transition temperature as the methacrylic resin and the other layer of which is made of the resin composition substantially free from the polymer having a low glass transition temperature as the methacrylic resin; and a multilayer film having a three layer structure, one layer of which is an interlayer and is made of the resin composition substantially free from the polymer having a low glass transition temperature as the methacrylic resin and the other layers as surface layers of which are made of the resin composition containing polymers having the above-mentioned low glass transition temperature as the methacrylic resin and are placed on both sides of the interlayer, respectively.

In the multilayer film, the thickness of the resin composition layer containing the polymer with a low glass transition temperature as the methacrylic resin may be equal to or thinner than the thickness of the resin composition layer substantially free from the polymer with a low glass transition temperature as the methacrylic resin. Preferably, the thickness of the resin composition layer containing the polymer with a low glass transition temperature is 0.05 to 0.5 time as thick as the thickness of the resin composition layer substantially free from the polymer with a low glass transition temperature. Here, the thickness is a total thickness of each of layers in the case that a plurality of layers exist in the multilayer film.

The acrylic film production in the present invention may be conducted in a melt spreading method; a melt extrusion method such as a T-die method and an inflation method; a calendaring method or the like. Preferably, the acrylic film is produced in the method of melting and extruding the above-mentioned resin composition from, for example, a T die to obtain a film-like product and bringing a roll or a belt into contact with at least one surface of the obtained film-like product. Such a method is preferred since it gives a film with excellent surfaces. More preferably from a viewpoint of improvement of surface smoothness and surface luster of the film, both surfaces of the film-like product obtained by the melt extrusion molding is preferably brought into roll surfaces or belt surfaces. The rolls or belts to be used are preferably made of metal. With respect to the rolls, those having specular surfaces are preferable. One of the preferable embodiments of the film production is a method comprising the steps of melting and extruding the resin composition containing the above-mentioned methacrylic resin and rubber particles from a T die and forming a film by bringing at least one specular roll surface into contact with the extruded product or, more preferably, pinching the extruded product between two specular rolls.

The multilayer film can be produced by separately preparing the respective layers in film-like form as mentioned above and conducting lamination of the layers, such as continuously laminating the film-like products between hot rolls, heat bonding them by a press, layering them simultaneously with compressed air formation or vacuum formation, or laminating them through adhesive layers. Alternatively, the multilayer film can be produced by a method of melting and extruding the respective resin compositions, or by a method of laminating one resin composition extruded from a T die onto a film-like product of another resin composition previously formed.

The acrylic film for a lens substrate in the present invention obtained in such a manner preferably has a tensile modulus of elasticity of 1,000 to 3,000 MPa at 23° C. measured in accordance with JIS K 7113. When the tensile modulus of elasticity is too low, film elongation or deformation tends to be caused easily owing to the tension for holding the film in the case of lens processing on the film surface and consequently, precise lens formability tends to be difficult. On the other hand, when the tensile modulus of elasticity is too high, in the case that the water content of the film is changed corresponding to the ambient environmental change, the stress generated by size change of the film tends to be large, and warping and sagging tend to occur, easily. The tensile modulus of elasticity is preferably 1,300 to 2,700 MPa, and is more preferably 1,500 to 2,500 MPa.

The acrylic film for a lens substrate in the present invention is made into be a lens film by forming a lens layer on its surface. Namely, the lens film in the present invention comprises an acrylic film as mentioned above and lens layer formed on the acrylic film. The lens film is excellent in the light fastness and is suitably used in a transmission type screen. The shape of the lens layer may be a Fresnel lens form, or a Lenticular lens form, or a prism lens form.

Formation of the lens layer on the acrylic film surface can be carried out by employing a conventionally known method using an ultraviolet-setting resin. For example, the lens layer may be formed on the acrylic film in the present invention using a mold (stamper) having a desired lens shape in a cavity. Specifically, the lens layer may be formed by spreading an ultraviolet-setting type resin on at least one surface of the film surfaces or the mold surface with the cavity, closely adhering the film surface to the cavity surface and radiating ultraviolet rays from the film side, to form a lens layer of a cured material of the ultraviolet-setting type resin on the film. The mold to be employed may have a plane shape, and preferably has a roll shape for continuously carrying out the steps.

Examples of the ultraviolet-setting resin include an acryloyl ultraviolet-setting resin, specifically acrylate compounds or methacrylate compounds having at least one acryloyloxy group or methacryloyloxy group in one molecule thereof. When the ultraviolet-setting resin is used, a photopolymerization initiator for generating radicals by radiating ultraviolet rays is also preferably utilized.

To improve adhesive between the film and the lens layer, the film may be subjected to a surface treatment with direct flame plasma, corona discharge, glow electric discharge plasma, ultraviolet rays or ozone, prior to or after the formation of the lens layer. Alternatively, onto the film, a conventionally known anchor coating agent may be applied.

Thus obtained lens film can be used alone, or may be laminated on a resin sheet as a support to obtain a lens sheet. In the latter case, the film can have toughness or various kinds of functions such as a light diffusion property, an antistatic property and an anti-reflection property. The thickness of the resin sheet as a support may be 0.5 to 5 mm. The lens sheet hardly causes deformation such as warping or sagging and is preferably used in a transmission type screen.

The lens film may be laminated on the resin sheet in such a way that the surface where no lens layer is formed may be stuck to the resin sheet using a conventionally known adhesive or pressure sensitive adhesive, to obtain a lens sheet. Surface treatment for the above-mentioned functions (such as a light diffusion property, an antistatic property and an anti-reflection property) can be applied to the lens sheet.

Examples of the resin sheet includes sheets of transparent resins such as acrylic resins, polycarbonate resins, polyolefin resins and poly(vinyl chloride) resins. The acrylic resins may be of homopolymers of methyl methacrylate, or may be copolymers of methyl methacrylate and other monomers. Among them, a methyl methacrylate-styrene copolymer sheet is preferably used, since the resulting lens sheet has less deformation such as warping or sagging.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2004-241985 filed on Aug. 23, 2004 and the Japanese Patent Application No. 2005-198511 filed on Jul. 7, 2005, both including specification, claims and summary, are incorporated herein by reference in their entirety.

EXAMPLES

The present invention is described in more detail by following Examples, which should not be construed as a limitation upon the scope of the present invention.

The units, percentage (%) and part, expressing a rate or an amount are on the weight basis unless otherwise specified.

(A) Methacrylic Resin

In Examples, the following methacrylic resins were used as mother phase. The glass transition temperature shown below is the extrapolation glass transition starting temperature measured at a heating speed of 10° C./minute by a differential scanning calorimetry (DSC) in accordance with JIS K 7121.

Methacrylic Resin (A1):
Resin pellets obtained by a bulk polymerization of a monomer composition containing a methyl methacrylate (97.8%) and a methyl acrylate (2.2%) (glass transition temperature: 103° C.).

Methacrylic Resin (A2):
Resin pellets obtained by a bulk polymerization of a monomer composition containing a methyl methacrylate (90%) and a methyl methacrylate (10%) (glass transition temperature: 92° C.).

Methacrylic Resin (A3):
Resin beads obtained by an emulsion polymerization of a monomer composition containing a methyl methacrylate (80%) and a methyl acrylate (20%) (glass transition temperature: 56° C.)

Methacrylic Resin (A4):
Resin beads obtained by an emulsion polymerization of a monomer composition containing a methyl methacrylate (60%) and a methyl acrylate (40%) (glass transition temperature: 19° C.).

(B) Preparation of Rubber Particles

A reaction vessel was charged with the total amount of medium (a) below and a half amount of the following raw materials (b) for innermost hard layer. Polymerization of the content in the vessel was carried out under nitrogen atmosphere at a temperature of 80° C. for 60 minutes while stirring. After that, the remaining half of materials (b) for innermost hard layer was continuously added to the vessel at the same temperature for 90 minutes, and aging was carried out at the same temperature for further 30 minutes while stirring, to obtain a hard polymer latex. Then, the following additional initiator (c) was added to the vessel, and the resulting content was stirred. After that, the following raw materials (d) for intermediate elastic layer were continuously added to the vessel at a temperature of 80° C. for 90 minutes, and was successively aged at the same temperature for 90 minutes while stirring, to obtain a latex containing particles having a structure composed of a hard layer as an innermost layer and a rubber elastic layer outside the innermost layer. Into the obtained latex, the following additional initiator (e) was added while stirring, and then, the following raw materials (f) for outermost hard layer was continuously added at a temperature of 80° C. for 60 minutes, and was successively aged at the same temperature for 30 minutes while stirring.

| [Medium (a)] | |
|---|---|
| ion-exchanged water | 150 parts by weight |
| sodium carbonate | 0.1 part by weight |
| [Raw materials (b) for innermost hard layer] | |
| methyl methacrylate | 62 parts by weight |
| methyl acrylate | 4 parts by weight |
| allyl methacrylate | 0.1 part by weight |
| ion-exchanged water | 15 parts by weight |
| sodium dodecylbenzenesulfonate | 0.32 part by weight |
| potassium persulfate | 0.03 part by weight |
| [Additional initiator (c)] | |
| sodium dodecylbenzenesulfonate | 0.3 part by weight |
| ion-exchanged water | 5 parts by weight |
| potassium persulfate | 0.1 part by weight |
| [Raw materials (d) for intermediate elastic layer] | |
| butyl acrylate | 70 parts by weight |
| styrene | 15 parts by weight |
| allyl methacrylate | 2 parts by weight |
| [Additional initiator (e)] | |
| ion-exchanged water | 5 parts by weight |
| potassium persulfate | 0.05 part by weight |
| [Raw materials (f) for outermost hard layer] | |
| methyl methacrylate | 30 parts by weight |
| methyl acrylate | 2 parts by weight |

As a result, a latex containing particles having a three-layer structure was obtained. The structure of the particles has a hard, crosslinked polymer layer made of methyl methacrylate, methyl acrylate and allyl acrylate as an innermost layer; a soft, elastic copolymer layer made of butyl acrylate, styrene, allyl methacrylate as an intermediate layer; and a hard polymer layer made of methyl methacrylate and methyl acrylate as an outermost layer. The number average particle diameter of the particles in the latex was measured by a laser light scattering diffraction method, and was found to be 0.22 μm.

Ion-exchanged water (1.5 times as much as that of the latex) was added to the latex, and then was heated to 80° C. While strongly stirring, magnesium sulfate (2% on the basis of the solid content of the latex) was added thereto, to coagulate polymer particles. After the polymer particles are isolated by filtration, the polymer particles were added to ion-exchanged water (20 times as much as that of the particles) heated to 80° C. and was stirred, to wash the polymer particles. Such a washing process was repeated five times in total, and then the particles is were dried by a vacuum drier at 80° C. to obtain rubber particles.

[Measurement of Average Particle Diameter of the Elastic Copolymer Layer of Rubber Particles]

The rubber particles were mixed with a methacrylic resin, and the resulting mixture was formed into a film. The film was cut into pieces, which was immersed in an aqueous 0.5% ruthenium tetraoxide solution at a room temperature for 15 hours to dye the elastic copolymer layer in the rubber particles. The pieces were further cut into smaller pieces with about 80 nm thickness using a microtome. The obtained pieces were photographed by a transmission electron microscope. In the photograph, 100 dyed rubber particles were randomly selected, and the particle diameter of the dyed portion was measured. As a result, the number average particle diameter of the elastic copolymer layer in the rubber particles was found to be 0.2 μm.

Example 1

(1) Production of Substrate Film

Methacrylic resin (A1) (60 parts) and the rubber particles (40 parts) obtained above were mixed by using a super mixer, melted and kneaded by using a biaxial extruder, and formed into resin composition pellets. A test specimen was obtained from the pellets by injection molding and subjected to notched Izod impact strength measurement in accordance with JIS K 7110 to find it was 6.5 kJ/m$^2$.

The pellets were melted and kneaded by using a monoaxial extruder of 65 mmφ manufactured by Toshiba Machine Co., Ltd. and extruded through a T die at 275° C. and cooled by bringing both faces of the resulting (extruded) product completely into contact with two polishing rolls to obtain a 75 μm-thick acryl film.

Specimens were cut out of the film in two directions (i.e., the direction (MD direction) parallel to the extrusion direction and the direction (TD direction) vertical to the extrusion direction) and subjected to the measurement of tensile modulus of elasticity at 23° C. in accordance with JIS K 7113. As a result, the modulus of elasticity in the MD direction and TD direction was 1,644 MPa and 1,701 MPa, respectively.

Separately, the surface hardness of the obtained film was evaluated with pencil scratch hardness in accordance with JIS K 5400. The results are shown in Table 1.

(2) Production of Lens Film

Between the above-obtained 75 μm-thick acryl film (as a substrate film) and a Lenticular lens mold, an ultraviolet-setting resin containing 95 parts of urethane acrylate (NK Oligo U-108A, manufactured by Shin-Nakamura Chemical Co., Ltd.) and 5 parts of a photopolymerization initiator (Irgacure 184, manufactured by Ciba Specialty Chemical Corp.) was added, and then ultraviolet ray was radiated from the film side so as to cure the ultraviolet-setting type resin to prepare a lens layer on the substrate film. As a result, a lens film having a Lenticular lens layer with 90 μm pitches on the substrate film was obtained. The light fastness of the obtained lens film and the lens layer were evaluated by the following method. The results are shown in Table 1.

[Light Fastness]

Using an accelerated weathering tester (Eye Super UV Tester SUV-F1, manufactured by Iwasaki Electric Co., Ltd.), ultraviolet ray was radiated at 100 mW/cm$^2$ intensity for 80 hours to the lens film. The lens film was observed after the ultraviolet ray radiation.

(3) Production of Lens Sheet

A pressure sensitive adhesive was applied to one side of the lens film obtained above where no lens layer was formed. Onto the adhesive, a methyl methacrylate-styrene copolymer sheet with 2 mm thickness and 50 inch diagonal length (MS 600, manufactured by Nippon Steel Chemical Co., Ltd.) was laminated to obtain a lens sheet. Weathering resistance stability of the obtained lens sheet was evaluated by the following method. The results are shown in Table 1.

[Weathering Resistance Stability]

The lens sheet was exposed to conditions of 65° C. and 90% RH for 168 hours and then was left at a room temperature for 7 days. The lens sheet was observed after the test whether or not there is any warping.

Example 2

The same operation was carried out as in Example 1, except that the amount of methacrylic resin (A1) was changed to be 80 parts, and the amount of the rubber particles was changed to be 20 parts in production (1) of the substrate film.

The obtained resin composition pellets were found to have 4.3 kJ/m$^2$ of notched Izod impact strength. The tensile modulus of elasticity of the substrate film at 23° C. was 2,432 MPa and 2,368 MPa in the MD direction and the TD direction, respectively. Further, the obtained substrate film, lens film, and lens sheet were evaluated in the same manner as in Example 1. The results are shown in Table 1.

Example 3

The same operation was carried out as in Example 1, except that 35 parts of methacrylic resin (A2) and 25 parts of methacrylic resin (A3) were used, instead of using 60 parts of methacrylic resin (A1) in production (1) of the substrate film.

The obtained resin composition pellets were found to have 6.1 kJ/m$^2$ of notched Izod impact strength. The tensile modulus of elasticity of the substrate film at 23° C. was 1,827 MPa and 1,791 MPa in the MD direction and the TD direction, respectively. Further, the obtained substrate film, lens film, and lens sheet were evaluated in the same manner as in Example 1. The results are shown in Table 1.

Example 4

The same operation was carried out as in Example 1, except that 47.5 parts of methacrylic resin (A2) and 12.5 parts of methacrylic resin (A4) were used, instead of using 60 parts of methacrylic resin (A1) in production (1) of the substrate film.

The obtained resin composition pellets were found to have 6.0 kJ/m$^2$ of notched Izod impact strength. The tensile modulus of elasticity of the substrate film at 23° C. was 1,796 MPa and 1,718 MPa in the MD direction and the TD direction, respectively. Further, the obtained substrate film, lens film, and lens sheet were evaluated in the same manner as in Example 1. The results are shown in Table 1.

Example 5

The same operation was carried out as in Example 1, except that 26 parts of methacrylic resin (A2) and 34 parts of methacrylic resin (A4) were used, instead of using 60 parts of methacrylic resin (A1) in production (1) of the substrate film The obtained resin composition pellets were found to have 5.9 kJ/m$^2$ of notched Izod impact strength. The tensile modulus of elasticity of the substrate film at 23° C. was 1,520 MPa and 1,469 MPa in the MD direction and the TD direction, respectively. Further, the obtained substrate film, lens film, and lens sheet were evaluated in the same manner as in Example 1. The results are shown in Table 1.

Example 6

Resin composition pellets were produced from 60 parts of methacrylic resin (A1) and 40 parts of rubber particles in the same manner as in Example 1. Also, in the same manner as in Example 4, resin composition pellets were produced from 47.5 parts of methacrylic resin (A2), 12.5 parts of methacrylic resin (A4) and 40 parts of the rubber particles. Next, the former pellets were melted and kneaded by a monoaxial extruder of 65 mmφ manufactured by Toshiba Machine Co., Ltd., and the latter pellets were melted and kneaded by a monoaxial extruder of 45 mmφ manufactured by Toshiba Machine Co., Ltd., both being extruded together through a Fordblock-way multilayer dies set at 260° C. and cooled by bringing both surfaces completely into contact with two polishing rolls, to obtain a 75 μm-thick acryl multi-layered film having a layer with a thickness of 62.5 μm of the former resin composition and a layer with a thickness of 12.5 μm of the latter resin composition. The tensile modulus of elasticity of the substrate film at 23° C. was 1,708 MPa and 1,667 MPa in the MD direction and the TD direction, respectively.

Then, the multi-layered film was used as a substrate film, and the surface hardness in the latter resin composition layer side was evaluated in the same manner as in Example 1. The latter resin composition layer side was used for forming a lens layer thereon. As a result, a lens film and a lens sheet were produced and evaluated in the same manner as in Example 1. The results are shown in Table 1.

Comparative Example 1

A 75 μm-thick polyester film (Lumirror 100, manufactured by Toray Industries, Inc.) was used as a substrate film, and a lens film and a lens sheet were produced and evaluated in the same manner as in Example 1. The results are shown in Table 1.

TABLE 1

| Example | Methacrylic resin (part) | | | | Rubber particles (part) | Surface hardness of Substrate film | Light fastness of lens film | Weathering resistance stability of Lens sheet |
| --- | --- | --- | --- | --- | --- | --- | --- | --- |
| | (A1) | (A2) | (A3) | (A4) | | | | |
| Example 1 | 60 | — | — | — | 40 | F | Non-colored | No warping |
| Example 2 | 80 | — | — | — | 20 | H | Non-colored | No warping |
| Example 3 | — | 35 | 25 | — | 40 | F | Non-colored | No warping |
| Example 4 | — | 47.5 | — | 12.5 | 40 | F | Non-colored | No warping |
| Example 5 | — | 26 | — | 34 | 40 | F | Non-colored | No warping |
| Example 6 | 60 | — | — | — | 40 | F | Non-colored | No warping |
| | — | 47.5 | — | 12.5 | 40 | | | |
| Comparative Example 1 | (Polyester resin) | | | | | HB | Colored (yellow) | Warping |

What is claimed is:

1. A lens film comprising an acrylic film for a lens substrate and a lens layer of an ultraviolet-setting resin formed on the acrylic film,
    wherein the acrylic film has a thickness of 400 μm or thinner and comprises a layer of a resin composition comprising a methacrylic resin and rubber particles dispersed therein.

2. The lens film according to claim 1, wherein the lens layer has a shape of Lenticular lens, prism lens or Lenticular lens.

3. A lens sheet comprising the lens film according to claim 1 and a resin sheet, in which the lens film is laminated on the resin sheet.

* * * * *